July 17, 1956  O. C. STEFFENS  2,754,571
METHOD OF MAKING A TWO-HEADED VALVE STEM
Filed Dec. 1, 1950
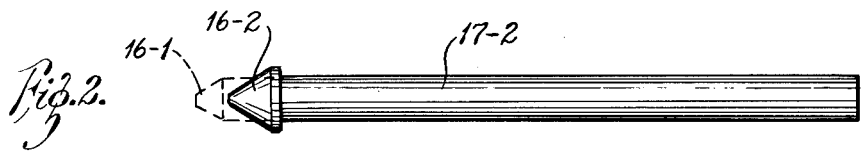
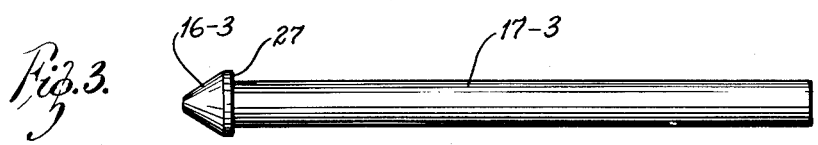
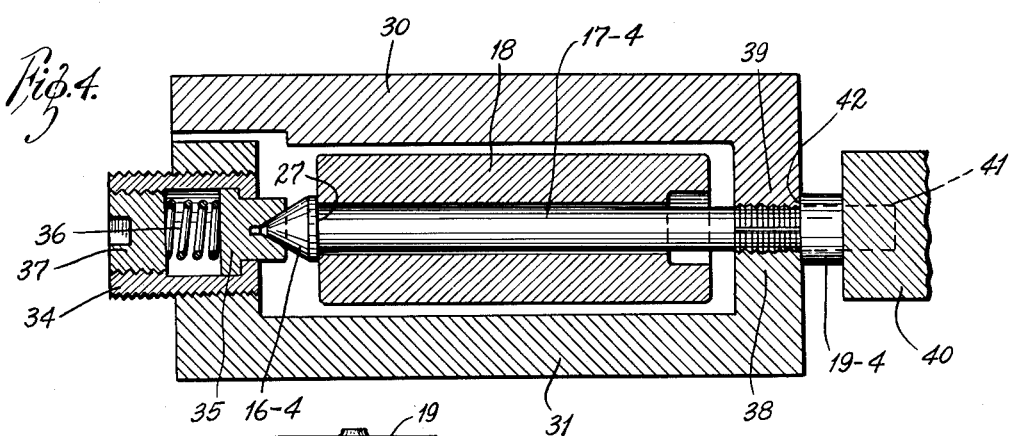
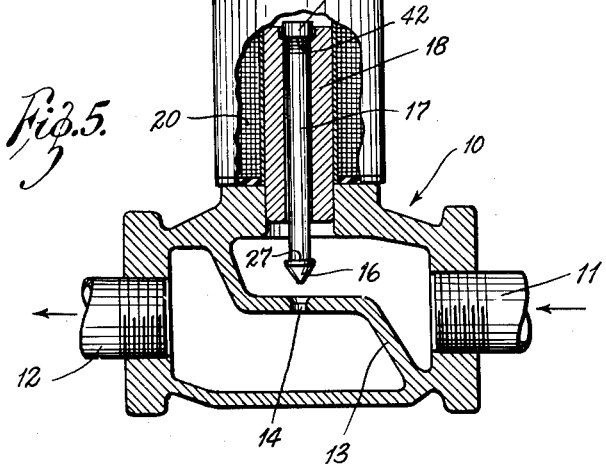
INVENTOR:
OSCAR C. STEFFENS,
BY Kingsland Rogers Ezell
ATTORNEYS

United States Patent Office 2,754,571
Patented July 17, 1956

2,754,571

METHOD OF MAKING A TWO-HEADED VALVE STEM

Oscar C. Steffens, St. Louis, Mo., assignor to Alco Valve Company, University City, Mo., a corporation of Missouri Application December 1, 1950, Serial No. 198,623

1 Claim. (Cl. 29—157.1)

The present invention relates to a solenoid valve stem or solenoid core, and a method of making the same.

The primary purpose of the present invention is to provide a method for making a solenoid core that is both simpler and better than heretofore; and a solenoid core that will give much greater wear at the particular point of failure thereof.

The invention is particularly adapted to use in connection with solenoid cores for magnetic valves, as will appear from the specification to follow.

In the drawings:

Figure 1 is a side view of the bar-stock from which the stem is made, in a preliminary state;

Figure 2 is a similar view showing a second stage, in which the valve or operating head is formed on the stem;

Figure 3 is a similar view to Figure 2 showing the head after it is completed by a machining or like operation;

Figure 4 is a view showing a further step wherein the plunger is mounted upon the stem and the retaining head is formed in an appropriate die; and Figure 5 is a more or less schematic view of a valve using the present invention.

Referring particularly to Figure 5, a valve generally indicated at 10 is shown, it having an inlet 11 and an outlet 12 with a partition 13 between them. The partition 13 has a port 14 through it that is adapted to be opened and closed by a valve assembly. The completed valve assembly is here shown as a head 16 formed upon a stem 17. The stem 17 is mounted in a magnetic core element or plunger 18 that is retained thereon between the valve head 16 and a retaining head 19. A magnetic coil 20 surrounds the core element 18 so that, when it is energized, it will lift the core 18 which, after a certain amount of free movement, will pick up the retaining head 19 to lift the valve 16. When the coil 20 is deenergized, the core member 18 descends and drives the valve head 16 into seating position.

The foregoing parts of the valve proper are shown diagrammatically, since their general operation and structure are familiar in the art.

In practicing the method, a piece of conventional bar-stock is used to form a valve stem with a valve head at one end and a retaining head at the other, both heads being integral with the stem. The preferred material is stainless steel (such as 303), but other materials may be used. The bar has a predetermined initial diameter, to which it may be brought by appropriate methods such as grinding.

In the drawings, the bar 17-1 is cut to a length that will, after formation of its two heads, provide the desired length of the stem 17. In Figure 1, the bar-stock 17-1 has a preliminary or rough form taper 16-1 formed onto one end thereof by a suitable means.

After the rough form taper 16-1 is made the stock 17-1 is put in a punch-press die, and the taper 16-1 is formed into a cold head taper 16-2. The head 16-2 is, in this process, entirely unitary with the bar-stock 17-2. In its formation, the stock 17-2 is shortened somewhat in order to give the material for the enlarged head 16-2.

In Figure 3, the cold head taper 16-2 is machined into the valve head 16-3, which is the final valve head shape illustrated at 16 in Figure 5. It will be seen that there is a shoulder 27 at the upper or inner end of the valve head 16-3, this shoulder 27 preferably being formed as part of the die operation.

In the next step of the process, the core member or plunger 18 is applied over the bar-stock member 17-4. Then the assembly is put in a two-part die and closed therein. The two parts of the die are here shown at 30 and 31. The die parts 31 illustrated as the lower die member has a seating device into which the tapered end 16-4 of the valve head may fit. The seating device includes a threaded fitting 34 mounted in the lower die member 31. The fitting 34 is hollow, and contains the matrix element 35 that has a tapered seat to receive the tapered head 16-4 as described. A spring 36 backs up the matrix 35, although permitting some outward movement thereof. The spring is retained by a threaded plug 37.

The other end of the stem is clamped between a jaw 38 on the lower die member 31, and a jaw 39 on a companion die member. The jaws 38 and 39 are each semi-cylindrical, and their clamping surfaces are serrated. Serrations are equal and opposite to avoid displacement and deformation of the stem. The jaws 38 and 39 are clamped against the stem so that their serrations bite into the surface thereof and unyieldably hold the stem against endwise movement. Any axial flow of metal caused by the biting of the jaws is absorbed by the spring 36, to prevent distortion of the stem.

With the parts thus located in the die and securely held as aforesaid, the press ram 40 then comes down on the extending end 41 of the member 17-4, and forms the retaining head 19-4 thereon. The retaining head 19-4 is formed in this operation with an inner shoulder 42. The distance between this shoulder 42 and the valve head 16-4 must be accurately maintained. By this operation of holding the stem securely by the serrated clamping jaws and holding it against the tapered matrix 35 at the other end of the die, the stem cannot slip despite the very high pressures employed for the cold head operation forming the retaining head 19-4.

After the retaining head is thus formed, the dies open and the sub-assembly is complete so that it can be assembled and applied to the valve as diagrammatically shown in Figure 5.

This process has a number of advantages over former processes. In the first place, it can use conventional bar-stock of the diameter of the stem portion, whereas former processes have required bar-stock to be cut down from the maximum diameter of the heads to the diameter of the stem. The bar-stock in this case is initially sufficiently accurate to form the main portion of the stem. Furthermore, in the old processes, one or both of the heads had to be formed as a separate part in order to apply the core member 18 thereto. This was usually done by providing a reduced upper end on the stem and inserting a collar-like member to form the retaining head. The collar-like member could be secured in place by a suitable punch-press operation. The process was obviously more costly than the present one.

In addition to the method advantages of the present assembly, the assembly itself is better than the old type. The principal point of wear, loosing, and breakage in the old type of valve stem occurred around the shoulder 42 of the retaining head 19. This came about because the lifting of the core member 18 by an electrical voltage applied to the coil 20 produces a strong hammer action in opening the valve. With the present construction, the cold head process not only forms the retaining head 19 as an integral part of the stem 16, so that it cannot be worked loose, but it also makes the shoulder portions 27 and 42 and valve pin head 16 somewhat harder so that they resist wear more readily than does untreated stock. The integral or unitary construction of both operating head and retaining head actually resists the destructive forces set up when the valve is opened or closed better than previous methods of construction. These destructive forces can cause a shearing force of the pin or threads if used to attach either head, or can cause stresses producing crystallization of the reduced section of stem to which either head is attached.

What is claimed is:

In a method of making a valve stem having two heads at its ends which are subjected to a striking force by a plunger loosely enclosing the valve stem, the improvement of making said heads of increased strength which comprises the steps of taking a metal bar of the diameter of the valve stem but somewhat longer, cold-heading a first head to be used as a valve head on a first end of the bar which is thicker than the bar and in the process shortening said bar, said first head protruding laterally beyond the diameter of the bar, loosely enclosing said bar completely about its periphery in the plunger so that it may be moved toward and away from the first head and be limited in its movement thereby and supporting said bar and plunger as a unit in a die by supporting said first head of the bar in a biased and adjustable positioning support and tightly holding the bar interiorly of its second end in a penetrating press device at a preselected distance from said first head determined by the position of said adjustable support and in such a manner that the plunger rides loosely on said bar, cold-heading a second head onto the protruding second end of the bar and against the press device to provide a head which is thicker than the bar so as to limit the movement of said plunger, and preventing any buckling of the bar by expanding the support for the first head against the biasing means.

References Cited in the file of this patent

UNITED STATES PATENTS

| 756,141 | Renner | May 29, 1904 |
| 1,034,726 | Mueller | Aug. 6, 1912 |
| 1,393,916 | Smith | Oct. 18, 1921 |
| 1,873,619 | Mojonnier | Aug. 23, 1932 |
| 1,995,451 | Handler | Mar. 26, 1935 |
| 2,241,747 | Shaw | May 13, 1941 |
| 2,504,428 | Kimball | Apr. 8, 1950 |
| 2,536,727 | Crawley | Jan. 2, 1951 |
| 2,544,209 | Wolcott | Mar. 6, 1951 |
| 2,577,654 | Gates | Dec. 4, 1951 |
| 2,598,868 | White | June 3, 1952 |